March 17, 1942. W. M. SCOTT, JR 2,276,675
CIRCUIT BREAKER TRIPPING SYSTEM
Filed Aug. 11, 1938 3 Sheets-Sheet 1

INVENTOR.
WILLIAM M SCOTT JR.
ATTORNEY.

March 17, 1942. W. M. SCOTT, JR 2,276,675
CIRCUIT BREAKER TRIPPING SYSTEM
Filed Aug. 11, 1938 3 Sheets-Sheet 2

INVENTOR.
WILLIAM M SCOTT JR.
ATTORNEY.

March 17, 1942. W. M. SCOTT, JR 2,276,675
CIRCUIT BREAKER TRIPPING SYSTEM
Filed Aug. 11, 1938   3 Sheets-Sheet 3
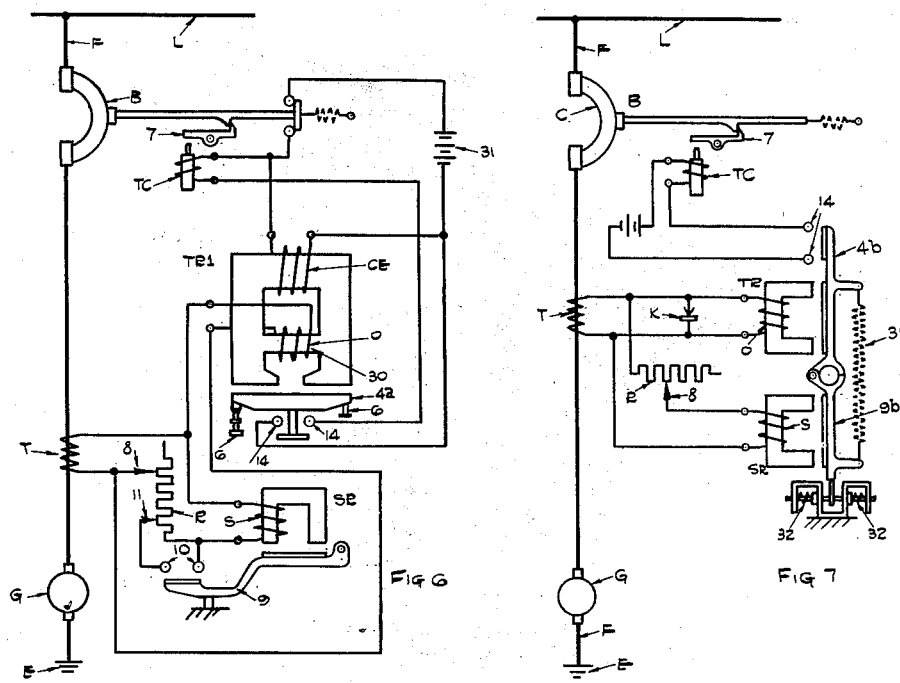
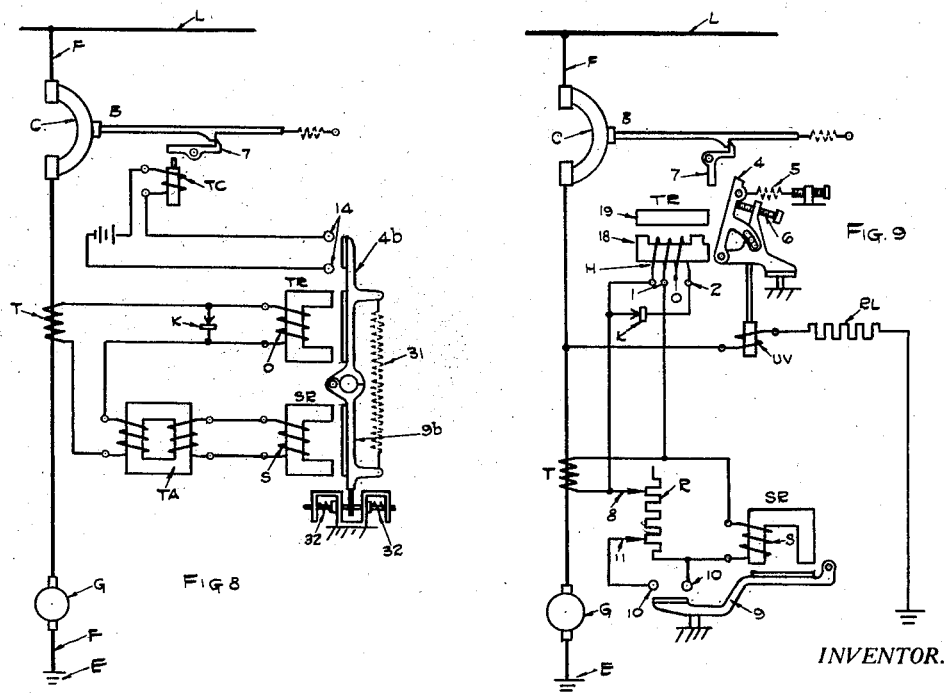
INVENTOR.
WILLIAM M. SCOTT JR.
Cornelius D. Ehret
ATTORNEY.

Patented Mar. 17, 1942

2,276,675

UNITED STATES PATENT OFFICE 2,276,675

CIRCUIT BREAKER TRIPPING SYSTEM

William M. Scott, Jr., Bryn Mawr, Pa., assignor, by mesne assignments, to I-T-E Circuit Breaker Company of Pennsylvania Application August 11, 1938, Serial No. 224,236

27 Claims. (Cl. 175—294)

My invention relates to relay systems and particularly to relay systems for controlling circuit breakers in feeder circuits to the third rails or trolley wires, particularly of direct-current railway systems.

In electrical railway systems, power is fed to the trains through a trolley wire or third rail and returns to the power source through the tracks and earth; usually the trolley wire or third rail is sectionalized and each of the sections is connected to a transmission line along the right of way; substations at the connecting points are provided with circuit breakers intended to protect the system in event of occurrence of faults or short circuits. Particularly in direct current systems using steel third rails, the circuit breakers may fail to open under some fault conditions and may undesirably open during some train-starting conditions; for example, when the fault is remote from a feeder connection, the fault current, because of the relatively high distributed inductance of the rail and the relatively high resistance of the fault circuit, rises slowly to a final magnitude which may be less than the magnitude of feeder current when a train is started near the substation and when a fault occurs near a feeder connection, the current in the nearby feeder rapidly rises to tripping magnitude and its circuit breaker opens but the fault may still be fed from a more remote feeder in which the feeder current rises slowly to a magnitude less than that normal for train-starting.

In accordance with my invention, the tripping systems for feeder circuit breakers discriminate between fault currents and train-starting currents irrespective of the location of the faults and of the trains during their starting: more particularly, the tripping system for a feeder circuit breaker includes a tripping magnet or relay which trips the circuit breaker when a slowly rising current attains a magnitude corresponding with the feeder current under distant fault conditions and a relay responsive, when the rate of rise of feeder current is substantially equal to or greater than the minimum rate of rise of feeder current under starting conditions, to provide, or modify, a shunt circuit for the tripping magnet or relay or to vary the bias upon the armature of the tripping magnet or relay and so preclude tripping of the breaker upon rapid rise of feeder current unless the increase in feeder current attain a magnitude in excess of the maximum increase of feeder current under starting conditions; preferably, the tripping current is derived from a current transformer whose primary is traversed by the feeder current.

In accordance with another aspect of my invention, means are provided to enable the tripping system to distinguish between rapid increase and rapid decrease of feeder current and to provide for tripping only when the feeder current is rising; to that end there is included in the tripping system of one modification, an asymmetric conductor, or rectifier, preferably connected in shunt to the winding of the tripping magnet or relay to divert from it at least a substantial part of the current from the transformer secondary when that current is due to decreasing rather than increasing feeder current; when the rectifier used is of a type permitting flow of inverse current, the tripping magnet or relay is preferably provided with an auxiliary coil so poled and proportioned that the forward current through the rectifier and traversing the auxiliary coil produces a magneto-motive force in opposition to, and preferably substantially equal to, the magneto-motive force developed by the tripping coil: in another modification, the tripping magnet or relay is polarized to discriminate between increase and decrease of the feeder current.

More particularly, in some forms of my invention, provision is made temporarily to de-sensitize the tripping magnet or relay during closure of the circuit breaker to preclude tripping in response to an inrush of current occurring the instant the feeder circuit is first completed; in a preferred arrangement, the tripping magnet or relay, during closure of the circuit breaker, is shunted by a resistance of suitably low magnitude which is cut out of circuit after the circuit breaker has closed.

My invention further resides in the features of combination and arrangement hereinafter described and claimed.

For an understanding of my invention, reference is made to the accompanying drawings, in which:

Figs. 1, 2 and 3 diagrammatically illustrate relay systems for controlling circuit breakers;

Fig. 1a discloses curves referred to in discussion of the operating characteristics of the tripping systems herein described;

Fig. 4 diagrammatically illustrates a distribution system with provision for disconnecting all feeder circuits from a fault;

Fig. 5 diagrammatically illustrates a modification of Figs. 1, 2 and 3 which provides for temporary desensitization of the tripping system during closure of the circuit breaker;

Fig. 6 illustrates a modification in which the tripping relay is polarized;

Figs. 7 and 8 illustrate further modifications in which the armatures of relays controlling tripping of a circuit breaker are mechanically coupled;

Fig. 9 illustrates a further modification in which a voltage coil provides a bias for the armature of the tripping magnet.

Figure 1:
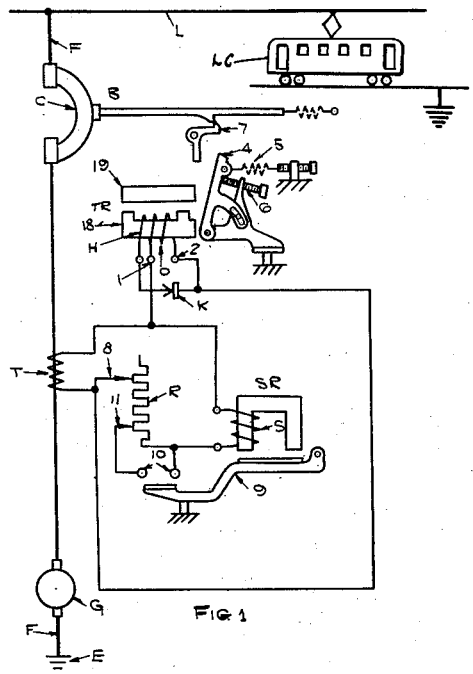

Referring to Fig. 1 which discloses a system for controlling the tripping of circuit breaker B in a feeder F, which may be one of many similarly protected feeders connected to the third rail or trolley wire L, the series transformer T is connected in the feeder in series with the contact structure C of the circuit breaker and the direct current generator G, one of whose terminals is connected through the breaker to the feeder F and the other of whose terminals is connected to the return circuit, or ground E, usually formed by the car rails. Preferably the magnetic circuit or core of the transformer is provided with an air gap to prevent saturation during flow of heavy currents and to enable it to respond to current surges even when heavily loaded. When there is an increase or decrease in magnitude of the current traversing the feeder there is produced by the transformer T a current whose polarity depends upon the sense of change (increase or decrease) of the feeder current, and whose magnitude is substantially proportional to the change in magnitude of the feeder current.

The secondary voltage of the transformer is impressed upon the terminals 1, 2 of the tripping magnet or relay TR whose tripping coil O is wound upon the core structure 18, 19 preferably provided with an air gap to prevent magnetic saturation under all conditions of operation. The armature 4 of relay TR biased as by spring 5 against adjustable stop 6, may either directly trip the breaker B, as by tripping latch 7, or equivalent, or may indirectly effect tripping of the breaker as by closure of the circuit of a tripping coil TC (Figs. 3 and 6 to 8).

In shunt to the operating coil O of the tripping relay TR are connected in series the resistance R, preferably adjustable as by contact 8, and the winding S of a relay SR. The resistance R and coil S provide in shunt to the operating coil O a path whose reactance is materially less than that of coil O; by selection or adjustment the resistance of coil O is materially less than that of resistance R and the inductance of coil O is high compared to the inductance of coil S.

When, under conditions hereinafter discussed, the current through relay SR attains sufficiently high value, its armature 9 closes the contacts 10, 10 to shunt all or part of the resistance R, depending upon the setting on contact 11, and so reduces the impedance of the shunt path R, S for the operating coil O of relay TR. In other words, when the relay SR responds to close its contacts, an increased percentage of the total current from the series transformer flows through the low reactance path R, S and a decreased percentage flows through coil O of the tripping relay TR.

Figure 1A:
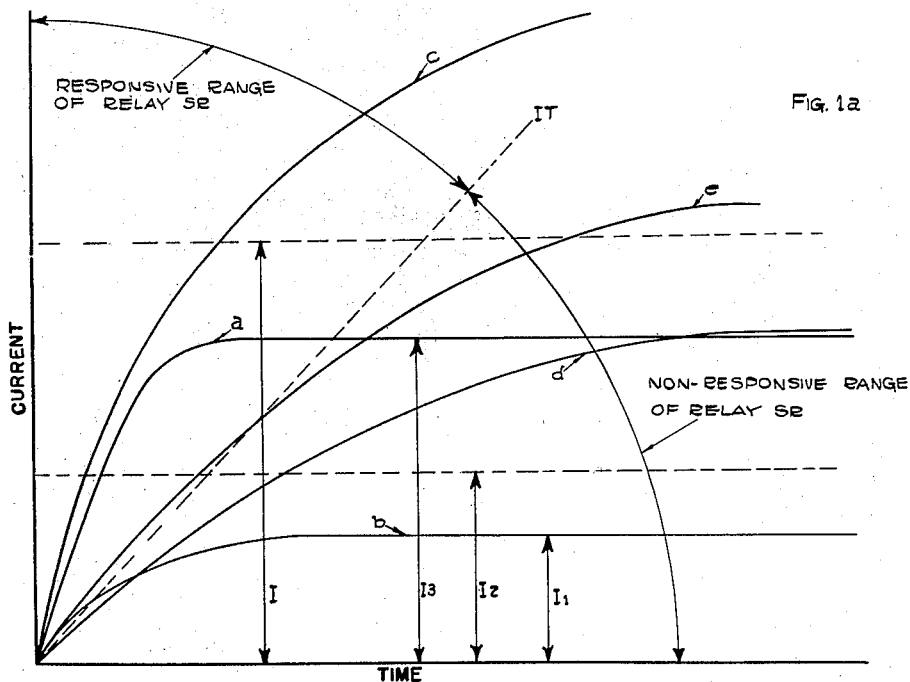

The operating characteristics of the tripping system of Fig. 1 and in fact of all the modifications herein described can best be understood from discussion of Fig. 1a, in which curves a and b are respectively exemplary of the rising feeder current when a train exemplified in Fig. 1 by locomotive LC, is started near the feeder connection to third rail and when a train is started at a more distant point, for example midway between two end feeders of a third rail section, and in which curves c, d and e are respectively exemplary of rising feeder currents when a fault occurs near a feeder connection, when a fault occurs at a remote point, for example at the other end of a third rail section, and when a fault occurs at an intermediate point.

A significant relation shown by curves b and d is that the rate of rise of feeder current under end-fault conditions is less than the rate of rise of feeder current during mid-section starting conditions. In the latter case, the rate of rise of feeder current is sufficiently high to cause response of relay SR and close its contacts 10, 10; with contacts 10, 10 closed, the tripping magnet TR does not respond unless the increase in feeder current corresponds with I (Fig. 1a), materially greater than the increase in feeder current I1 occurring during mid-point starting. In the former case, the rate of rise of feeder current is insufficient to effect response of relay SR and therefore the tripping magnet effects tripping of the circuit breaker for an increase I2 in feeder current suitably greater than the increase due to mid-section starting. In brief, when the rate of rise of the feeder current is less than that of a curve, not shown, whose tangent is IT, which latter is somewhat less steep than the tangent to curve b at its point of greatest curvature, the tripping magnet TR responds to an increase I2 in feeder current which is greater than the increase I1 in feeder current due to mid-section starting and when the rate of rise of feeder current is greater than that of a curve whose tangent is IT the relay SR responds to divert current from coil O of the tripping magnet so that it does not respond unless or until the increase in feeder current attains a magnitude I suitably higher than the increase I3 in feeder current due to nearby starting yet sufficiently lower than the ultimate increase in feeder current otherwise occurring in event of a nearby fault adequately to protect the sub-station equipment.

To summarize, the relay SR discriminates between the rate of rise of feeder current due to end faults and the rates of rise of feeder current due to less remote faults and to all starting conditions. Within the sector marked "responsive range of relay SR" which comprehends all feeder-current increase curves whose tangents are steeper than IT, the tripping system ensures protection against nearby and intermediate faults without needless tripping during train-starting by tripping only when the feeder current increase corresponds in magnitude with I, whereas within the sector marked "Non-responsive range of relay SR" the tripping system ensures protection against end faults without needless tripping during train-starting by tripping when the feeder current increase corresponds in magnitude with I2.

The tripping system as thus far described is incapable of distinguishing between transformer current due to decrease of the feeder current and transformer current due to increase of feeder current and therefore there is the possibility the circuit breaker may trip under conditions of rapid decrease of feeder current and so interrupt the power when there exists no need to do so. This unnecessary tripping of the breaker may be prevented by connecting a rectifier K across the operating coil O of tripping relay TR and poling it to pass current in its forward or low resistance direction when the feeder current is decreasing, thus then to serve as a low impedance shunt preventing the current in operating coil O of magnet TR from attaining a magnitude sufficient to trip the circuit breaker.

When the rectifier or asymmetric conductor is of type permitting flow of substantial inverse current, for example a copper, copper-oxide rectifier, the relay TR is preferably provided with an auxiliary coil H and the rectifier K is connected across, or in series with, the two coils H and O which are so relatively poled and proportioned that when the current flows in the forward direction through the rectifier the net magneto-motive-force of the two coils is negligible and insufficient to effect tripping movement of armature 4 even for rapid decrease in magnitude of the feeder current.

Figure 2:
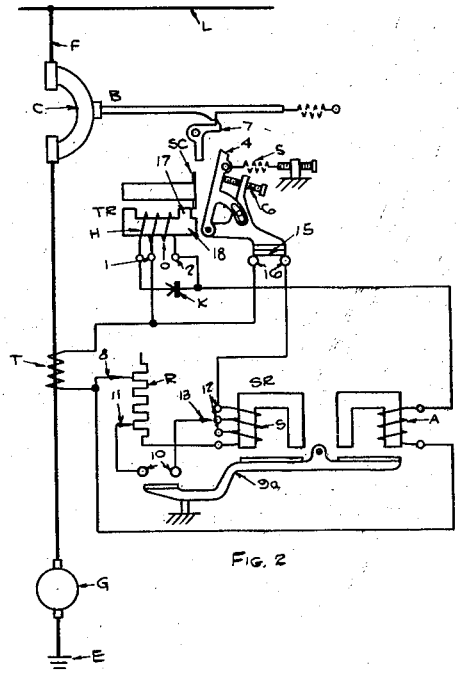

In the relay system of Fig. 1, closure of the relay contacts 10, 10 effects a reduction of the impedance of the shunt path S, R by decreasing the effective magnitude of the resistance R. Alternatively, or in addition, the closure of contacts 10, 10 may be utilized to reduce the effective reactance of the shunt circuit: for example, as shown in Fig. 2, the coil S may be provided with a multiplicity of taps connected to the points 12 of a switch whose relatively movable contact 13 is connected to one of the relay contacts 10. By suitably varying the position of the contact 11 and/or contact 13, there can be obtained any desired change in magnitude of the impedance of the shunt path S, R when contacts 10, 10 are closed, and with establishment of any desired relation of the resistance to the reactance of this path. However, the taps are so arranged that the smallest number of turns provided between contact 13 and the upper terminal of coil S is effective to hold the relay armature 9a against its pole after it has been attracted thereto.

Further to enhance the ability of the relay or tripping system to distinguish between rates of rise of feeder current associated with normal starting operations and short circuits, the relay SR (Fig. 2) may be provided with an auxiliary coil A in series with the operating coil O of the relay TR. Thus there is imposed upon the armature 9a of the relay SR, a variable biasing effect whose magnitude is determined by the magnitude of current through the operating coil O of the tripping relay. For rapid changes in magnitude of the feeder current, and therefore of the secondary current of transformer T, the inductive reactance of the current path A, O is large and the current through the shunt circuit S, R more rapidly approaches the value for which the armature 9a is attracted to close contacts 10, 10. When, however, the rate of current rise is materially lower, the distribution of current between the two paths is so changed that a greater proportion than before flows through the circuit A, O and, in addition, the increased biasing effect of coil A upon the armature 9a requires a greater current through coil S than before to effect movement of the armature 9a.

Figure 3:
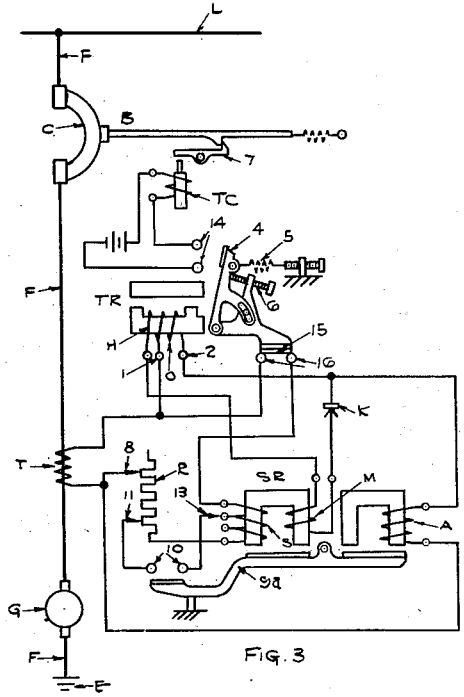

The movement of the armature 4 of the tripping coil TR may be utilized directly to trip the circuit breaker, as in Fig. 1, or, as shown in Fig. 3, the armature when in its attracted position may engage contacts 14 to close the circuit of a tripping coil TC thus indirectly to effect tripping of the feeder circuit breaker B.

The operating power of the tripping armature 4 may be increased at the moment of its initial movement by causing it to open the shunt path S, R so that a greater part or all of the current of transformer T traverses the operating coil O of the tripping relay; the armature 4 may have a lost motion connection to the contact member 15 which normally bridges the contacts 16, 16 to complete the shunt path S, R.

Preferably the relay TR is so constructed that the armature 4 does not engage the pole pieces in its innermost position, thus to preclude possibility of the armature sticking to the pole pieces. To insure high inductance of the operating coil circuit there may be provided the magnetic shunt element 17 which, in the arrangement particularly shown, is an extension of the core member 18. To introduce greater time lag into the operation of the armature 4, one or more copper rings SC, or equivalent, may be disposed about that end of either of the core members 18, 19 nearest to the armature 4.

The relay system shown in Fig. 3 is the same as that shown in Fig. 2 except that relay SR is provided with an additional coil M in series with the rectifier K across the terminals of the coils O, H of the tripping relay TR. The purpose of this coil is to ensure operation of the relay SR when the current from the transformer is of the sense or polarity corresponding with a rapid decrease in magnitude of the feeder current. The closure of the contacts 10, 10 of the relay SR diverts more of the current through the shunt path and so reduces the load on the rectifier K. When the polarity of the transformer current is reversed, a materially smaller portion of it flows through the coil M because of the asymmetric conductivity of the rectifier and thus, when the feeder current is increasing, coil M has little or no effect upon the operating characteristics of the relay SR.

The systems previously described particularly apply to protection of the feeders from two sub-stations supplying power to a common distribution line or section thereof but in many systems there are more than two sub-stations spaced along the right of way at various suitable intervals to supply a common load circuit. When the short circuit or fault occurs between two sub-stations their circuit breakers will open as previously described, but in systems where the trolley wire or third rail is continuous, power will be fed to the fault from the sub-station or sub-stations beyond those protected by tripping of the circuit breakers. For example, referring to Fig. 4, stations #1, 2 and 3 may be protected by relay systems similar to any of the types herein described. When a fault occurs at the point Z, for example, between stations #2 and #3, the feeder breakers B2, B3 are tripped as above described, but the rate of change of current in feeder F1 at more remote station #1 may be so slow because of the inductance of the long circuit from the connection of feeder F1 to the fault Z that breaker B1 does not open and it would not be possible to adjust the relay system to trip under this circumstance without so setting it that it would trip under normal starting or switching operations. To ensure tripping of the breaker B1, and of other circuit-breakers still more remote from the fault, the fault is in effect shifted along the affected section L to cause the tripping of the breakers in all feeders supplying that section; more particularly, each of the breakers, or at least each of those intermediate the ends of the section, is provided with auxiliary contacts which upon opening of the breaker produce an artificial or intentional fault to increase the current through the adjacent feeder at such rapid rate that its circuit breaker is in turn tripped. Specifically, in the particular example shown in Fig. 4, when the circuit breaker B2 opens it closes the auxiliary contacts 20, 20 to effect energization of a relay 21 whose contacts 22 thereupon move to complete an artificial fault circuit from the line to ground adjacent station #2. Preferably the artificial fault circuit so completed may include a resistance R1 to limit the current through feeder F1 to a magnitude not materially in excess of that required to ensure tripping of circuit breaker B1. Closure of contacts 22 also effects energization of holding coil 21H to maintain closed the artificial fault circuit until breaker B1 is tripped. It is of course to be understood that the circuit breakers at each of the other stations may be similarly equipped to shift a fault along until all sub-stations feeding that fault have been disconnected. It is not necessary that the sub-stations or feeders near the ends of a section be so equipped because their circuit breakers will respond to any fault between them and the next sub-station.

Figure 4:
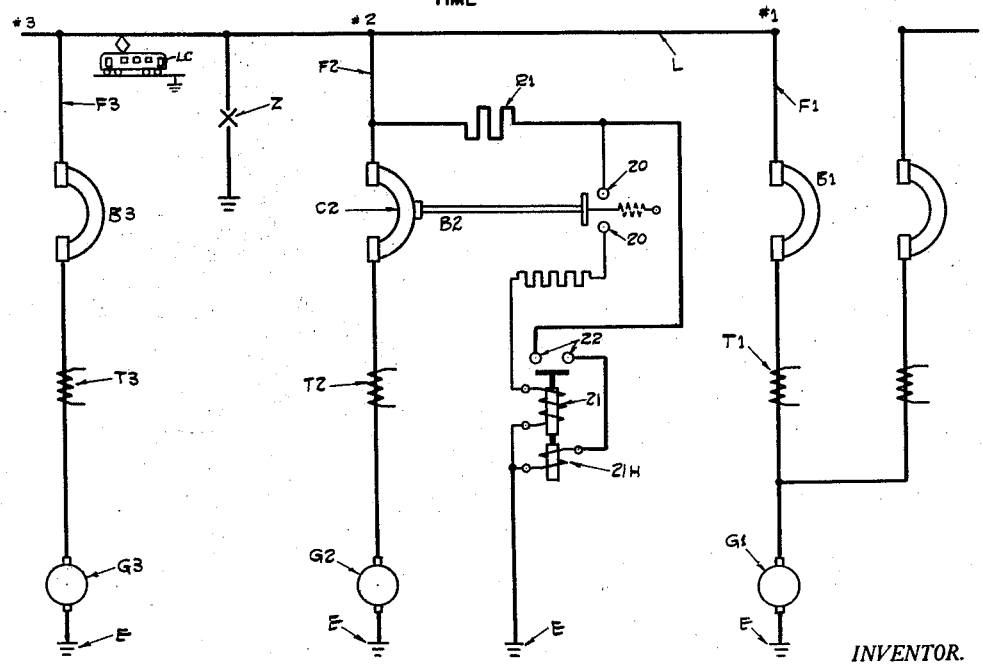

The fault-shifting arrangement disclosed in Fig. 4 is claimed in my co-pending application Serial No. 344,851, in part a continuation hereof, filed July 11, 1940.

Figure 5:
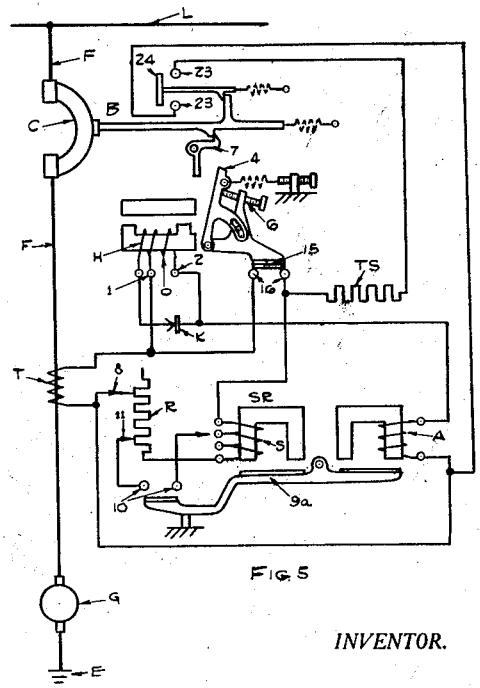

When a feeder circuit is completed by closure of its circuit breaker, the rate of change of feeder current may be such that the relay systems thus far described effect tripping of the breaker even though only normal load conditions exist. To prevent this, the secondary of the transformer T may be shunted, as by resistance TS of suitably low magnitude, until after the circuit breaker has closed the feeder circuit. Referring to Fig. 5, when the circuit breaker B is open its auxiliary contact 24 is in engagement with contacts 23 to connect resistance TS in shunt to the secondary of transformer T and this engagement is maintained until after the movable contact C of the circuit breaker has engaged the stationary contacts to complete the feeder circuit. After such engagement and during the final increment of closing movement of contact C, the contact 24 is, in any suitable manner, pushed away from contacts 23, 23 to open the shunt circuit including the resistance TS. Thus during the initial surge of feeder current, the relay system is de-sensitized but immediately after the feeder circuit is closed its sensitivity is restored for normal operation as previously described in connection with Figs. 1 to 4.

The circuit breakers in all modifications are preferably of the "trip-free" type, for example as disclosed in my Patent #2,025,731, in which event, the resistance TS of Fig. 5 is of such magnitude that notwithstanding its shunting effect upon coil O, the circuit breaker will trip if, during its closure and before disengagement of contact 24 from contacts 23, there exists a fault near the feeder connection.

In the systems of Figs. 1 to 3, a rectifier K is used to preclude tripping of the breaker when the secondary current of transformer T, though of magnitude and rate of change in magnitude sufficient to effect tripping, is of polarity corresponding to a decrease, rather than an increase, of the feeder current. In the system of Fig. 6, the rectifier K is not used and its aforesaid purpose is obtained by a modified construction of the tripping relay TR1 which replaces tripping relay TR of Figs. 1 to 3. The tripping coil O is wound upon a magnetic shunt element 30 extending between the legs of the U-shaped core or an electromagnet whose coil CE is energized by unidirectional current supplied from battery 31 or other suitable source. When only coil CE is energized, the electromagnet is incapable of moving armature 4a to close contacts 14, 14. The coils CE and O are so wound and connected that when the current through coil O is of polarity corresponding with decrease in magnitude of the feeder current its magneto-force is of such sense the reluctance of the magnetic shunt 30 is in effect reduced and so even more of the magnetic flux is diverted from armature 4a with the result it is not attracted even though the rate of change of the feeder current is high. When, however, the current in coil O is of polarity corresponding with an increase in feeder current, the magneto-motive-force produced by coil O in effect increases the reluctance of the magnetic shunt 30 and forces a greater proportion of the flux through the armature. Therefore, for increases of feeder current, the circuit breaker is tripped if those increases are due to fault conditions previously herein discussed.

In the tripping systems thus far described, the trip relay or magnet TR is set to trip at a predetermined flow of current through its operating coil O, and its calibration, insofar as feeder current is concerned, is in effect changed by variation of the impedance of a path in shunt to the operating coil. In the modifications shown in Figs. 7 and 8, the calibration of the trip relay to obtain rate-selective operation is automatically varied in another manner; specifically, the bias restraining movement of the armature 4 of the tripping relay TR is varied by mechanically coupling armature 4 to the armature of the relay SR. Referring to Fig. 7, the armature 4b of relay TR is connected by spring 31 to the armature 9b of relay SR whose normal position is determined by the centering springs 32, 32. As in the modifications previously described, the operating coil of the relay TR has, or is included in, a circuit of high inductance and low resistance and is shunted by a path R, S of high resistance and low inductance. Consequently when the feeder current is changing at high rate, a greater proportion of the current from the series transformer T passes through the shunt circuit including coil S which thereupon moves its armature 9b in such direction as to move the armature 4b further away from the pole pieces 13, 13, thus to require greater current through coil O to effect tripping movement of armature 4b. At lower rates of change of feeder current the effect of the relay SR upon the position of armature 4b is less, and therefore less current through coil O of the tripping relay is required to effect tripping movement of armature 4b.

The relay system shown in Fig. 8 is similar to that of Fig. 7 except that the coil S of relay SR is energized from transformer TA whose primary is connected in series with the primary of transformer T and the relay TR. Because the secondary current of transformer TA is a function of the rate of change of the secondary current of transformer T which in turn is a function of the rate of change of the feeder current, the biasing effect of relay SR upon the armature 4b of the tripping relay TR is much greater for high rates of change of feeder current. The arrangements shown in Figs. 1 to 3, 5 and 6 are, however, more easily adjusted to afford the desired rate-selective action.

In any of the systems disclosed, provision for manual tripping may be made by connecting a normally open switch and a source of current, a battery for example, across the terminals of the coil O or in those systems having an auxiliary tripping coil TC, the manually controlled switch may be connected across contacts 14, 14 of the tripping relay.

The modification shown in Fig. 9 is similar to preceding figures, particularly Fig. 1, with the addition there is imposed upon the armature 4 of the tripping magnet or relay TR, as by coil UV, preferably in series with a current-limiting resistor RL, a restraining action whose magnitude is a function of the voltage between the third rail, or equivalent, and ground. Thus it is ensured the circuit breaker will trip if a relatively small increase of current occurs while the line voltage is substantially below normal. During existence of very heavy load, for example during simultaneous starting of several trains in the same section, particularly when they are also drawing current for heating and lighting, the sub-station may be overloaded and have little reserve capacity to deliver current to a fault or short circuit. Under these conditions, the voltage is below normal and a fault, taxing the station beyond its limit, would increase the feeder current by only a relatively small amount but would cause a substantial drop in voltage and therefore substantial reduction in the restraining action of coil UV. Consequently under such conditions, the operating characteristic of the relay system is so modified, the armature 4 operates to effect tripping of the circuit breaker B when a fault occurs even though the additional feeder current due to the fault may be relatively small.

What I claim is:

1. A tripping system for a circuit breaker comprising a series transformer whose primary is traversed by current through the circuit breaker, an electromagnetic device for effecting tripping of said circuit breaker energized from the secondary of said transformer, an impedance variable to modify the energization of said device from said secondary, and electromagnetic means energized from said transformer and having armature structure movable to vary said impedance so to vary the sensitivity of said electromagnetic device to changes in magnitude of said current as a function of the rate of change of said current.

2. A tripping system for a circuit breaker comprising a series transformer whose primary is traversed by current through the circuit breaker, an electromagnetic device for effecting tripping of said circuit breaker having a winding energized from the secondary of said transformer, and a current path in shunt to said winding including in series resistance of magnitude materially greater than the resistance of said winding and reactance whose magnitude is materially less than the reactance of said winding.

3. A tripping system for a circuit breaker comprising a series transformer whose primary is traversed by current through the circuit breaker, an electromagnetic device for effecting tripping of said circuit breaker having a winding energized from the secondary of said transformer, a current path in shunt to said winding including resistance materially higher than the resistance of said winding and a relay coil whose inductance is materially less than the inductance of said winding, an armature for said relay coil, and relay contacts operated by said armature to decrease the impedance of said shunt path when the current through said relay coil attains a predetermined magnitude.

4. A tripping system for a circuit breaker comprising a series transformer whose primary is traversed by current through the circuit breaker, an electromagnetic device for effecting tripping of said circuit breaker having a winding energized from the secondary of said transformer, a current path in shunt to said winding including resistance materially higher than the resistance of said winding and a relay coil whose inductance is materially less than the inductance of said winding, an armature for said relay coil, and relay contacts controlled by said armature to decrease the effective magnitude of the resistance of said shunt path when the current through said relay coil attains a predetermined magnitude.

5. A tripping system for a circuit breaker comprisign a series transformer whose primary is traversed by current through the circuit breaker, an electromagnetic device for effecting tripping of said circuit breaker and whose winding is energized from the secondary of said transformer, a current path in shunt to said winding including resistance materially higher than the resistance of said winding and a relay coil whose inductance is materially less than the inductance of said winding, an armature for said relay coil, and relay contacts controlled by said armature to decrease the effective inductance of said coil when the current through it attains a predetermined magnitude.

6. A tripping system for a circuit breaker comprising a series transformer whose primary is traversed by current through the circuit breaker, an electromagnetic device for effecting tripping of said circuit breaker having a winding energized from the secondary of said transformer, a current path in shunt to said winding including resistance materially higher than the resistance of said winding and a relay coil whose inductance is materially less than the inductance of said winding, an armature for said relay coil, and relay contacts controlled by said armature to change in magnitude the inductance and resistance of said shunt path when the current through said coil attains a predetermined magnitude.

7. A relay system for controlling a circuit breaker comprising a transformer whose primary is in series with the circuit breaker, an electromagnetic device for tripping said circuit breaker energized from the secondary of said transformer, and an asymmetric conductor in shunt to said device to divert therefrom a substantial part of the current from said secondary for one sense of change in magnitude of uni-directional current traversing said secondary.

8. A relay system for controlling a circuit breaker comprising a transformer whose primary is in series with the circuit breaker, an electromagnetic device for tripping said circuit breaker having a winding energized from the secondary of said transformer, and a circuit in shunt to said winding comprising an asymmetric conductor and a second winding of said device.

9. A relay system for controlling a circuit breaker comprising a transformer whose primary is in series with the circuit breaker, an electromagnetic device for tripping said circuit breaker having a winding energized from the secondary of said transformer, and a circuit in shunt to said winding comprising a rectifier, of the type permitting flow of inverse current, and a second winding of said device, said windings being so poled and proportioned that their resultant magnetic effect is small during flow of forward current through said rectifier.

10. A tripping system for a circuit breaker comprising a series transformer whose primary is traversed by current through the circuit breaker, an electromagnetic device for effecting tripping of said circuit breaker having a winding energized from the secondary of said transformer, a second electromagnetic device having a winding whose inductance is materially less than the inductance of said first-named winding, a current path in shunt to said first-named winding comprising a resistance connected in series with said second-named winding, armature structure controlled by the current through said second-named winding to vary the impedance of said path, and a winding in series with said first-named winding for opposing movement of said armature structure in response to current through said second-named winding.

11. A relay system for tripping a circuit breaker comprising a transformer whose primary is in series with the circuit breaker, an electromagnetic device for effecting tripping of said circuit breaker having a winding energized from the secondary of said transformer, and a second electromagnetic device having windings connected respectively in shunt to and in series with said first-named winding and having armature structure responsive to the differential effect of its windings to vary the impedance of a current path in shunt to said first-named winding.

12. A relay system for tripping a circuit breaker comprising a transformer whose primary is in series with the circuit breaker and a source of direct current, an electromagnetic device for effecting tripping of the circuit breaker having a winding energized from the secondary of said transformer, a relay for controlling the impedance of a path in shunt to said winding, a path in shunt to said winding comprising an asymmetric conductor, and means for ensuring operation of said relay to reduce the current through said coductor for one sense of change of the primary current of said transformer comprising a winding of said relay connected in series with said conductor.

13. A relay system for tripping a circuit breaker comprising a transformer whose primary is in series with the circuit breaker, an electromagnetic device for effecting tripping of the circuit breaker having a winding energized from the secondary of said transformer, an asymmetric conductor in shunt to said winding, and a relay for controlling the impedance of a path in shunt to said winding, said relay having a winding included in said path, a winding in series with said asymmetric conductor, and a winding in series with said first-named winding.

14. A relay system for tripping a circuit breaker comprising a transformer whose primary is in series with the circuit breaker, an electromagnetic device for effecting tripping of the circuit breaker having a winding energized from the secondary of said transformer and an auxiliary winding, an asymmetric conductor, and a relay for controlling the impedance of a path in shunt to said first-named winding, having a winding included in said path, a winding in circuit with said auxiliary winding and said asymmetric conductor, and a winding in series with said first-named winding.

15. A relay system for tripping a circuit breaker comprising a transformer whose primary is in series with the circuit breaker, an electromagnet having a winding energized from the secondary of said transformer and an armature whose movement effects tripping of said circuit breaker, and means for controlling the impedance of a path in shunt to said winding comprising a relay which has contact structure movable to vary said impedance and which is deenergized upon tripping movement of said armature effectively to increase the energization of said electromagnet.

16. A relay system for tripping a circuit breaker comprising a transformer whose primary is in series with the circuit breaker, an electromagnet having a winding energized from the secondary of said transformer and an armature whose movement effects tripping of said circuit breaker, and means for controlling the impedance of a path in shunt to said winding comprising a relay whose winding is included in said path in series with contacts separated by said armature during its tripping movement.

17. In a tripping system for a direct-current circuit breaker, means for precluding tripping of the breaker upon decrease in magnitude of the feeder current, and means for precluding tripping of said breaker when the rate of change of current in sense and of magnitude otherwise effecting tripping is due to closure of the breaker.

18. A tripping system for a circuit breaker having a latch for holding its contact structure in closed circuit position comprising a series transformer whose primary is traversed by current through the circuit breaker, an electromagnetic device for tripping said latch energized from the secondary of said transformer, and means operable during closing of said circuit breaker temporarily to de-sensitize the system until appreciably after resetting of said latch and so preclude tripping of the circuit breaker by that rapid change of said current incident to closure of the circuit breaker under normal load conditions.

19. A tripping system for a circuit breaker having a latch for holding its contact structure in closed circuit position comprising a series transformer whose primary is traversed by current through the circuit breaker, an electromagnetic device for tripping said latch energized from the secondary of said transformer, and electrical desensitizing means controlled by said circuit breaker and operable during closing movement thereof to prevent said transformer from energizing said device sufficiently to effect tripping of said latch until after occurrence of the initial surge of current incident to closure of the circuit breaker under normal load conditions.

20. A tripping system for a circuit breaker comprising a series transformer whose primary is traversed by current through the circuit breaker, an electromagnetic device energized from the secondary of said transformer, a de-sensitizing resistance connected in shunt to said device during closure of said circuit breaker, and switching means operable after initial engagement of the circuit breaker contacts to disconnect said resistance after initiation of flow of said current by closure of said circuit breaker.

21. A tripping system for a circuit breaker comprising a series transformer whose primary is traversed by current through the circuit breaker, an electromagnetic device energized from the secondary of said transformer upon rapid change in magnitude of the current traversing said circuit breaker, and switching means in circuit with said device and operable during initial engagement of the circuit breaker contacts temporarily to preclude energization of said device to extent sufficient to effect tripping of said circuit breaker by that rapid change of current incident to closure of the circuit breaker under normal load conditions and operable after said initial engagement to restore normal relation between the energization of said device and the secondary current of said transformer.

22. In an electrical railway system comprising a third rail or trolley wire, a feeder connected thereto, and a circuit breaker in said feeder, a relay system for controlling tripping of said circuit breaker, with discrimination between feeder currents due to short circuits and those due to train-starting comprising a transformer whose primary is traversed by uni-directional current of magnitude corresponding with changes in magnitude of the feeder current, an electromagnetic device for effecting tripping of said circuit breaker having a winding energized from the secondary of said transformer, a current path in shunt to said winding including resistance materially greater than the resistance of said winding and a relay coil whose inductance is materially less than the inductance of said winding, an armature for said relay coil, and relay contacts controlled by said armature to decrease the effective impedance of said shunt path when the current through said relay coil attains a predetermined magnitude.

23. In an electrical railway system comprising a third rail or trolley wire, a feeder connected thereto, and a circuit breaker in said feeder, a relay system for controlling tripping of said circuit breaker, with discrimination between feeder currents due to short circuits and those due to train-starting comprising a transformer whose primary is traversed by uni-directional current of magnitude corresponding with the magnitude of the feeder current, an electromagnetic device for effecting tripping of said circuit breaker having a winding energized from the secondary of said transformer, and means for varying the percentage of secondary current traversing said winding as a function of the rate of change in magnitude of the feeder current comprising in a current path in shunt to said winding and including resistance materially greater than the resistance of said winding and inductance materially less than the inductance of said winding.

24. A tripping system for a direct-current circuit breaker comprising a series transformer whose primary is traversed by direct-current through said circuit breaker, an electromagnetic device for tripping said circuit breaker energized from the secondary of said transformer, and a relay for varying the sensitivity of said device in accordance with the rate of change of said direct-current energized from said transformer and having contact structure in circuit with said device.

25. A tripping system for a circuit breaker comprising means for tripping said circuit breaker upon occurrence of predetermined increase of current through the circuit breaker, and means for altering in accordance with rate of change of said current the magnitude of its increase required to effect tripping of the circuit breaker by said first-named means comprising a relay the position of whose contact structure is different for different rates of change of said current to vary the relation between the energization of said tripping means and the magnitude of said current.

26. A system comprising a third rail or trolley wire, two feeders connected thereto at substantially spaced points, a circuit breaker in each of said feeders, and means for effecting tripping of each of said circuit breakers upon occurrence of a fault along said rail or wire near or remote from aforesaid connection thereto of its feeder and for precluding tripping of either circuit breaker upon train-starting anywhere between said points comprising for each of said circuit breakers a transformer whose primary is in the associated feeder, an electromagnetic device for effecting tripping of the circuit breaker having a winding energized from the secondary of said transformer, and a current path in shunt to said winding including in series reactance whose magnitude is materially less than the reactance of said winding and resistance of magnitude materially greater than the resistance of said winding.

27. A railway system comprising a third rail or trolley wire, a plurality of feeders connected thereto at substantially spaced points, a circuit breaker in each of said feeders, and relay systems for controlling tripping of said circuit breakers with discrimination between feeder currents due to short circuits and those due to train starting adjacent said points each comprising means precluding tripping of the associated circuit breaker upon decrease in magnitude of its feeder current, and means for precluding tripping of the associated circuit breaker when the rate of change and magnitude of its feeder current otherwise effecting tripping is due to a reclosure of the circuit breaker.

WILLIAM M. SCOTT, Jr.